United States Patent
Henriksson et al.

(10) Patent No.: US 9,469,693 B2
(45) Date of Patent: Oct. 18, 2016

(54) PROCESS FOR THE DERIVATIZATION OF CELLULOSE

(75) Inventors: Gunnar Henriksson, Solna (SE); Mikael Lindstrom, Lidingo (SE)

(73) Assignee: Re:Newcell Lux S.a.r.l., Rue Edward Steichen (LU)

( * ) Notice: Subject to any disclaimer, the term of this patent is extended or adjusted under 35 U.S.C. 154(b) by 228 days.

(21) Appl. No.: 13/880,798

(22) PCT Filed: Oct. 26, 2011

(86) PCT No.: PCT/SE2011/051270
§ 371 (c)(1),
(2), (4) Date: Jul. 29, 2013

(87) PCT Pub. No.: WO2012/057684
PCT Pub. Date: May 3, 2012

(65) Prior Publication Data
US 2013/0324710 A1    Dec. 5, 2013

Related U.S. Application Data

(60) Provisional application No. 61/407,047, filed on Oct. 27, 2010.

(51) Int. Cl.
| | | |
|---|---|---|
| *C08B 1/00* | (2006.01) | |
| *C08B 15/00* | (2006.01) | |
| *C08B 1/08* | (2006.01) | |
| *C08B 11/12* | (2006.01) | |
| *C08B 1/02* | (2006.01) | |
| *C08B 1/06* | (2006.01) | |
| *C08B 16/00* | (2006.01) | |
| *D21C 9/00* | (2006.01) | |
| *D21H 11/20* | (2006.01) | |
| *C08B 3/06* | (2006.01) | |
| *C08B 11/02* | (2006.01) | |

(52) U.S. Cl.
CPC ............... *C08B 11/12* (2013.01); *C08B 1/003* (2013.01); *C08B 1/02* (2013.01); *C08B 1/06* (2013.01); *C08B 3/06* (2013.01); *C08B 11/02* (2013.01); *C08B 16/00* (2013.01); *D21C 9/004* (2013.01); *D21C 9/005* (2013.01); *D21H 11/20* (2013.01)

(58) Field of Classification Search
CPC .......... C08B 1/003; C08B 15/00; C08B 1/08
USPC ...................... 536/124, 56, 84, 97
See application file for complete search history.

(56) References Cited

U.S. PATENT DOCUMENTS

| | | |
|---|---|---|
| 1,658,606 A | 2/1928 | Lilienfeld |
| 4,089,745 A | 5/1978 | Antrim et al. |
| 5,410,034 A | 4/1995 | Isogai et al. |
| 5,906,926 A | 5/1999 | Keunecke et al. |
| 6,106,763 A | 8/2000 | Struszczyk et al. |
| 6,541,627 B1 * | 4/2003 | Ono et al. .............. 536/56 |
| 8,758,517 B2 * | 6/2014 | Henriksson ............ C12P 7/10 127/37 |
| 2008/0102502 A1 | 5/2008 | Foody et al. |

FOREIGN PATENT DOCUMENTS

| | | |
|---|---|---|
| EP | 0147634 A2 | 7/1985 |
| EP | 0344371 A1 | 12/1989 |
| EP | 1245576 A1 | 10/2002 |
| EP | 1900860 A1 | 3/2008 |
| JP | 09316101 | 12/1997 |
| SU | 1669917 A1 * | 8/1991 |
| WO | 2007003699 A1 | 1/2007 |
| WO | 2008095098 A2 | 8/2008 |
| WO | 2010124944 A1 | 11/2010 |

OTHER PUBLICATIONS

Bondar et al, English Language Translation (SU 1669917 A1).*
Extended European Search Report for Application No. 11836723.4 dated Jul. 28, 2014.
Fock, vW., "Eine modifizierte Method zur Bestimmung der Reaktivität von. Zellstoffen für Viskosherstellung, Das Papier", 1959, 13(3), 92-95, (English Summary provided on p. 92).
Gellerstedt G.; "Cellulose Products and Chemicals from Wood", Wood Chemistry and Wood Biotechnology; Eds: MEk, G Gellerstedt and G Henriksson. De Gruyter ISBN 978-3-11-021339-3, 2009, pp. 173-193.
International Search Report for Application No. PCT/SE2011/051270 dated Feb. 15, 2012.
Jeihanipour, A. and Taherzadeh, M.; Ethanol Production From Cotton-Based Waste Textiles, Bioresource Technology, 2009, 100, 1007-1010.
Kamide K., "Cellulose and Cellulose Derivatives Molecular Characterization and its Applications", Elsevier ISBN 10: 0-444 82254-2, 2005 (book submitted in 4 parts).
lsogai, A. and Kato, Y.; "Preparation of polyuronic acid from cellulose by TEMPO-mediated oxidation", Cellulose,1998, 5, 153-164.
Ohno, H. and Fukaya, Y.; "Task specific ionic liquids for cellulose technology", Chemistry Letters, 2009, vol. 38, No. 1, 2-7.
Zhao et al.; Enhanced Enzymatic Hydrolysis of Spruce by Alkaline Pretreatment at Low Temperature, Biotechnology and Bioengineering, Apr. 15, 2008, 99:6, 1320-1328.

* cited by examiner

*Primary Examiner* — Patrick Lewis
*Assistant Examiner* — Everett White

(57) ABSTRACT

There is disclosed a process for the derivatization of cellulose comprising the sequential steps: a) mixing cellulose with a viscosity below 900 ml/g with an aqueous solution to obtain a liquid, wherein particles comprising cellulose in said liquid have a diameter of maximum 200 nm, wherein the temperature of the aqueous solution is below 20° C., and wherein the pH of the aqueous solution is above 12, b) subjecting the liquid to at least one of the steps: i) decreasing the pH of the liquid with at least 1 pH unit, ii) increasing the temperature by at least 20° C., and c) derivatization of the cellulose. Advantages include that there is provided the possibility to derivatize cellulose faster and to a greater extent after the treatment. Further the yield is improved. The product quality is improved and the manufacture is cheaper and easier.

23 Claims, No Drawings

PROCESS FOR THE DERIVATIZATION OF CELLULOSE

CROSS-REFERENCE TO RELATED APPLICATIONS

The present application is a national phase entry under 35 U.S.C. §371 of International Application No. PCT/SE2011/051270 filed Oct. 26, 2011, published in English, which claims priority from U.S. Provisional Application No. 61/407,047 filed Oct. 27, 2010 all of which are incorporated herein by reference.

TECHNICAL FIELD

The present invention relates to a process for improving the manufacture of cellulose derivatives including regenerated cellulose. A cellulose derivative is included as an intermediate in the manufacture process.

BACKGROUND

Cellulose is an important constituent in plants and comprises anhydrous glucose units. Unmodified cellulose is often difficult to use in applications due to limited solubility and complex crystalline structure. To overcome this problem cellulose is derivatized, and then it's physical properties are changed and it can be used in many materials, medical and food applications.

The derivatization of cellulose is complicated due to the resistibility of the material. When cellulose is derivatized it is difficult to control the degree of substitution and the yield in the process. Groups may also be uneven distributed along the cellulose chain which may give quality problems (Kamide K (2005) "Cellulose and Cellulose Derivatives" Elsevier ISBN 10: 0-444-82254-2).

There are several known ways to dissolve cellulose for various applications including manufacture regenerated cellulosic fiber. Often expensive chemicals are used in such processes. (Ohno H and Fukaya Y (2009)Task specific ionic liquids for cellulose technology Chemistry Letters V38)

Zhao et al, in Biotechnology and Bioengineering, pp. 1320-1328, Vol. 99, No. 6, 2008 discloses treatment of wood fiber bundles with NaOH and NaOH/Urea. There is disclosed treatment with cold NaOH. The treated pulp is neutralized. Any cellulose which is dissolved in the NaOH solution is apparently not used further. It is disclosed that treatment with cold NaOH is advantageous. The yield is improved with pretreatment.

WO 2008/095098 discloses a process for the manufacture of sugar from biomass, where the biomass is pretreated with alkali solution to improve the following hydrolysis. The temperature is increased and is 50-150° C., preferably 80-140° C.

Jeihanipour et al, in Biorecource Technology, pp. 1007-1010, Vol. 100, 2009 discloses alkali pretreatment of cotton linter followed by enzymatic hydrolysis. It is disclosed that low temperatures improves the process. The cellulose material which is used is not dissolved or suspended in the alkali solution, it remains solid. A problem in this technology is that some of the cellulose material dissolves and is discarded, which reduces the yield.

EP 0 344 371 A1 discloses a method for the production of monosaccharides by hydrolysis of lignocellulosic materials. There is no dissolution of the cellulose, where the dissolved cellulose is recovered. The cellulose is washed, but cellulose that is dissolved is apparently not recovered.

U.S. Pat. No. 4,089,745 discloses a process for enzymatic conversion of corn hull cellulose to glucose. Again there is no dissolution of the cellulose, where the dissolved cellulose is recovered. The cellulose is washed, but cellulose that is dissolved is apparently not recovered.

US 2008/0102502 A1 concerns recovery of inorganic salt during processing of lignocellulosic feedstocks. It is mentioned that carbon dioxide can be used to adjust pH.

There is a need for an improved process for the derivatization of cellulose.

SUMMARY

It is an object of the present invention to obviate at least some of the disadvantages in the prior art and to provide an improved process for the treatment of cellulose before the derivatization stage.

In a first aspect there is provided a process for the derivatization of cellulose comprising the sequential steps: (a) mixing cellulose with a viscosity below 900 ml/g with an aqueous solution to obtain a liquid, wherein particles comprising cellulose in said liquid have a diameter of maximum 200 nm, wherein the temperature of the aqueous solution is below 20° C., and wherein the pH of the aqueous solution is above 12, (b) subjecting the liquid to at least one of the steps: (i) decreasing the pH of the liquid with at least 1 pH unit and (ii) increasing the temperature by at least 20° C., and (c) derivatization of the cellulose.

Further aspects and embodiments are defined in the appended claims, which are specifically incorporated herein by reference.

Advantages include that there is provided the possibility to derivatize cellulose faster and to a greater extent after the treatment. Further the yield is improved.

This can lead to cheaper and easier manufacture and improved product quality for instance regarding an even distribution of substitutes.

One advantage is that the yield is increased compared to methods which discard an alkali treatment solution. In the present method the cellulose material is treated with an alkali solution, and the alkali solution, which inevitably comprises cellulose is not discarded.

Another advantage is that the liquid is possible to pump since it is a solution and/or a colloidal system with particles not larger than 200 nm.

Another advantage is that the waste of cellulose material is reduced or even eliminated.

Compared to known methods the present process is easy to perform in a large scale set up.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

Unless clearly indicated, all percentages are calculated by weight.

The term "about" as used in connection with a numerical value throughout the description and the claims denotes an interval of accuracy, familiar and acceptable to a person skilled in the art. Said interval is ±10%.

"Colloid system" is used herein to denote a system comprising two separate phases, a dispersed phase and a continuous phase. The dispersed phase comprises particles with an average diameter of between 5-200 nm. In the present invention a colloidal system comprises particles comprising cellulose with an average diameter of between 5-200 nm in a continuous aqueous phase, where the aqueous phase may comprise dissolved cellulose and other dissolved substances.

"Diameter" of an irregular particle as used herein is the longest distance between two points on its surface.

"Fluid" is used herein to denote a substance that continually deforms (flows) under an applied shear stress. Fluid comprises all liquids and all gases.

"Liquid" is used herein to denote a fluid that can freely form a distinct surface at the boundaries of its bulk material. The term liquid encompasses both solutions as well as colloidal systems such as a colloidal suspension.

"Solution" is used herein to denote a homogeneous mixture comprising at least one substance dissolved in a solvent.

The term "viscosity" for an aqueous cellulose mixture is a standard term within in pulp and paper industry. The term is well known by persons skilled in the art of cellulose including pulp and paper making. Its value is related to the average degree of polymerization of the cellulose, i.e. how long the individual cellulose chains are. A high value indicates that the cellulose has long chains and high degree of polymerization, whereas a low value indicates that the cellulose have low degree of polymerization. The viscosity value is proportional to the average molecular weight of the cellulose molecules. The limiting viscosity number ("viscosity") in the present description and in the appended claims is determined according to ISO 5351. "Pulps—Determination of limiting viscosity number in cupri-ethylenediamine (CED) solution Reference number 5351:2004 (E), International Organization for Standardization, Geneva, Switzerland.

Fock-test: A simulation of viscose method, where an alkaline soluble cellulose derivatives cellulose xanthate is formed, which subsequently is precipitated to regenerated cellulose, by an acid treatment that removes the xanthate groups. The yield of the process is a measurement of the reactivity of the cellulose (Fock vW. (1956) Eine modifizierte Methode zur Bestimmung der Reaktivität von Zellstoffen für die Viskoseherstellung. Das Papier, 92-96). Another way to measure chemical reactivity (i.e., easiness to make cellulose derivatives) is to measure the rate of acid or enzymatic hydrolysis.)

There is provided a process for the derivatization of cellulose comprising the sequential steps: (a) mixing cellulose with a viscosity below 900 ml/g with an aqueous solution to obtain a liquid, wherein particles comprising cellulose in said liquid have a diameter of maximum 200 nm, wherein the temperature of the aqueous solution is below 20° C., and wherein the pH of the aqueous solution is above 12, (b) subjecting the liquid to at least one of the steps: (i) decreasing the pH of the liquid with at least 1 pH unit and (ii) increasing the temperature by at least 20° C., and (c) derivatization of the cellulose. The latter can be a step in a process for making regenerated cellulose.

The cellulose is mixed with the aqueous solution so that a liquid is obtained. The liquid which is obtained is either a solution of cellulose in the aqueous solution or a combination of a solution of cellulose and a colloidal system with dispersed particles comprising cellulose in the aqueous solution. The particles comprising cellulose have a diameter of 200 nm or less. In one embodiment the particle diameter is from about 5 nm to about 200 nm.

In one embodiment the viscosity of the cellulose is below 900 ml/g. In one embodiment the viscosity of the cellulose is below 700 ml/g.

In one embodiment there is a step before step a), wherein the viscosity of cellulose with a viscosity above 900 ml/g is lowered to below 900, preferably below 700 ml/g. This is particularly useful when cellulose with a viscosity above 900 ml/g is to be treated. In one embodiment treatment with acid is used to reduce the viscosity of the cellulose.

In alternative embodiments the degradation is performed using a radical generating system. Examples include the Fenton reaction, (i.e. transition metal ions and hydrogen peroxide), hypochlorite, and alkaline hydrolysis at high temperature. More precise Fenton's reagent is a solution of hydro hydrogen peroxide and an iron catalyst. In one embodiment the viscosity is lowered before step a) by treatment with at least one method selected from treatment with Fenton's reagent and treatment with an alkaline solution.

In one embodiment the aqueous solution in step a) comprises at least one strong base. In one embodiment the aqueous solution in step a) comprises NaOH. NaOH is a suitable and economical way of achieving a high pH in this method. In one embodiment the aqueous solution comprises at least 2 wt % NaOH. In one embodiment the aqueous solution comprises at least 5 wt % NaOH. In one embodiment the aqueous solution comprises at least 8 wt % NaOH. In one embodiment the aqueous solution comprises at least 10 wt % NaOH.

In one embodiment the liquid is filtered between step a) and step b). In another embodiment the liquid if centrifuged between step a) and step b) in order to remove impurities. It is an advantage that the process provides this possibility to remove impurities which have not dissolved in the liquid.

In one embodiment the pH is decreased in step b) by addition of an acid. This has the effect of precipitating the cellulose from the liquid. In one embodiment the acid is sulphuric acid.

In an alternative embodiment the pH is decreased in step b) by addition of $CO_2$. Also $H_2CO_3$ may be employed particularly in combination with $CO_2$. Thus there is disclosed an embodiment where the pH is decreased in step b) by addition of at least one chemical entity selected from $CO_2$, and $H_2CO_3$. This is advantageous for use in an industrial scale, where $CO_2$ can be recycled in the process according to methods well known to a person skilled in the art of papermaking.

In one embodiment the temperature is below 20° C. in step a). In one embodiment the temperature is below 15° C. in step a). In one embodiment the temperature is below 10° C. in step a). In one embodiment the temperature is below 4° C. in step a). A lower temperature is beneficial although the process can be carried out at room temperature, i.e. at about 20° C. In one embodiment the temperature is below ambient temperature in step a). In one embodiment the temperature is below 17° C. in step a).

In one embodiment cellulose which has not been dissolved and/or suspended to a particle size below 200 nm in step a) is recycled to step a). In this way any waste of cellulose can be minimized. In one embodiment fibers which are larger than 200 nm are removed in step a).

The derivatization is carried out introducing groups including but not limited to at least one group from methoxy, acetyl, methyl, carboxy methyl, ethyl, sulfate, phosphate and quaternary ammonia groups. The groups are introduced in at least one of the C2-, C3- and C6-position of the anhydroglucose unit of cellulose.

In one embodiment step c) comprises chemical derivatization of cellulose using acid catalysis. Manufacture of cellulose derivatives with acid catalysis is used mainly for making cellulose esters, including but not limited to cellulose acetate. The cellulose is mixed with a target molecule, such as an acetic acid anhydride. In one embodiment the mixing is performed under water free conditions. Strong acid, such as sulphuric acid, is added, and the hydroxyl groups of the cellulose perform nucleophilic attacks on the target molecule, which have been made more reactive by the strong acid, causing a chemical coupling on the cellulose. (Gellerstedt G (2009) "Cellulose Products and Chemicals from wood" In "Wood Chemistry and Wood Biotechnology" Eds: M Ek, G Gellerstedt and G Henriksson. De Gruyter ISBN 978-3-11-021339-3 pp 173-193)

In one embodiment step c) comprises chemical derivatization of cellulose using alkaline catalysis. Manufacture of cellulose derivative by alkaline catalysis is used mainly for making cellulose ethers, including but not limited to carboxymethyl cellulose. The cellulose is mixed with a target molecule, such as chlorine acetic acid. In one embodiment the mixing is performed under water free conditions. Strong base, such as sodium hydroxide, is added and the hydroxyls of the cellulose is partly deprotonated by the strong base, which make them reactive and able to perform nucleophilic attacks on the target molecules causing a chemical coupling on the cellulose.

In one embodiment step c) comprises chemical derivatization of cellulose using oxidation. Manufacture of cellulose derivatives by oxidation convert cellulose alcohols to aldehydes or carboxylic acids. These reactions can be done in water using for instance TEMPO as catalyst and sodium hypochlorite as oxidant (Isogai A and Kato Y (1998) "Preparation of polyuronic acid from cellulose by TEMPO-mediated oxidation" Cellulose 5, 153-164).

In a second aspect there is provided cellulose derivate manufactured by derivatization according to the above process. The cellulose derivate can be used in many material applications, food applications and medical applications.

Examples of cellulose derivatives include but are not limited to cellulose ethers, cellulose esters and inorganic cellulose derivatives. Example of cellulose ethers include but are not limited to carboxymethyl cellulose, methyl cellulose, and ethyl cellulose. One example of cellulose esters includes cellulose acetate. In one embodiment the cellulose derivative is at least one selected from carboxymethyl cellulose, methyl cellulose, ethyl cellulose, and cellulose acetate.

Other features and uses of the invention and their associated advantages will be evident to a person skilled in the art upon reading this description and the appended examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

Dissolution of Different Celluloses at 4° C.

Cellulose quality: Avicel (Microcrystalline cellulose), cotton linter, sulphite pulp, birch kraft pulp. Viscosities of the samples were measured according to ISO 5351. This is a method to get a viscosity value that is dependent on the degree of polymerization of mainly the cellulose in the samples; the higher the viscosity, the higher the average degree of polymerization of the samples.

Treatment conditions: Every 1 g sample was added to 50 ml 10% NaOH at 4° C., and subjected to magnetic stirring for approx 1 h.

The solutions were evaluated for how clear they appeared.

| Sample | Appearance | Viscosity (ml/g) |
|---|---|---|
| Avicel | One phase and transparent | 120 |
| Birch kraft pulp | Some suspended substance in the solution, not totally dissolved | 710 |
| Cotton linter | Some suspended substance in the solution, not totally dissolved | 900 |
| Sulphite pulp | Some suspended substance in the solution, not totally dissolved | 550 |

Only Avicel is totally dissolved. The other one are not totally in one phase. The Avicel has shorter cellulose chains. The non transparent samples indicate that the cellulose has not dissolved completely.

Example 2

Dissolution in Varying Concentration of Cellulose

Cellulose quality: Avicel (Microcrystalline cellulose)
Treatment conditions: 1 g or 2 g cellulose were added to 50 ml 10% NaOH at varying temperature, and subjected to magnetic stirring for approx 1 h.

| | Appearance | |
|---|---|---|
| Temperature | 1 g sample | 2 g sample |
| 4° C. | One phase and transparent | One phase, not so transparent, a little bit milky |
| 10° C. | One phase and transparent | One phase, milky |
| Room Temperature | One phase, not so transparent | One phase, light yellow color |
| 40° C. | Two phases, some precipitate | — |

Example 3

Dissolution at Varying Concentration

Cellulose quality: Avicel (Microcrystalline cellulose)
Treatment conditions: Samples 0.05 g, 0.1 g, 0.25 g, 0.5 g, 1 g Avicel in 50 ml 1%, 5%, 8%, 10% NaOH respectively. All experiments were done at 4° C.

The solutions were evaluated for if the Avicel dissolved.

| Avicel/g | $C_{NaOH}$ | | | |
|---|---|---|---|---|
| | 1% | 5% | 8% | 10% |
| 0.1 | dissolved | Dissolved | dissolved | dissolved |
| 0.2 | dissolved | Dissolved | dissolved | dissolved |
| 0.5 | Not dissolved | Dissolved | dissolved | dissolved |
| 1 | — | — | — | dissolved |
| 2 | — | — | — | dissolved |

Along with the increase of the concentration of NaOH, more Avicel will be dissolved (as a reference a solution of 2% NaOH has a pH of about 12.8 at 25° C.).

Example 4

Dissolution at Varying Concentration

Cellulose quality: Avicel (Microcrystalline cellulose)
Treatment conditions: 0.05 g, 0.25 g, 0.5 g, 1 g, 2.5 g, 5 g cellulose were added to 50 ml 10% NaOH at 4° C., and subjected to magnetic stirring for approx 1 h.
The solutions were evaluated for how clear they were.

| Avicel/g | Appearance |
|---|---|
| 0.1 | Very clear solution |
| 0.5 | One phase and transparent, but not very clear |
| 1.0 | One phase, transparent |
| 2 | One phase, transparent |
| 4 | One phase, not transparent, a little bit light yellow color |
| 5 | Nearly opacity, like a colloid |
| 10 | Cannot be dissolved |

When the Avicel concentration reached a certain point, the sample will become a colloid, and not a true solution. During the dissolving stage, stirring is very important, strong stirring can dissolve the Avicel easily and fast.

Example 5

Dissolution at Varying Temperature

Cellulose quality: Avicel (Microcrystalline cellulose)
Treatment conditions: 1 g cellulose were added to 50 ml 10% NaOH at varying temperature, and subjected to magnetic stirring for approx 1 h. The effect was mostly done within 10 minutes.
The solutions were evaluated for how clear they were. Photos were taken in some cases.

| Temperature | Appearance |
|---|---|
| 4° C. | One phase and transparent |
| 10° C. | One phase and transparent |
| Room Temperature | One phase, not so transparent |
| 40° C. | Two phases, some precipitate |

All of the celluloses were dissolved in 4° C., 10° C. and room temperature, but at 40° C. when the magnetic stir is stopped, some precipitate occurred. At room temperature a stable suspension is obtained, which can be treated as a fluid from a technical point of view.

Example 6

Precipitation of Cellulose with Carbon Dioxide

Cellulose quality: Avicel (Microcrystalline cellulose)
Treatment conditions: 1 g Avicel was dissolved in 50 ml 10% NaOH solution at 4° C., and then either precipitate it with sulphuric acid (pH adjusted to pH 7) or by flushing carbon dioxide gas. A beaker with the solution was flushed with carbon dioxide gas meanwhile the solution was stilled by magnetic stirring. The precipitate come quick, but the flushing was continued for 1 h. The pH was then 10. A continuous 30 min of flushing did not change the pH.
The precipitates were collected and weight.
The yield of the carbon dioxide precipitation was 86.1%, and the acid precipitation was close to 100%

The results show that adjustment of pH with carbon dioxide (that forms carbonic acid) can be used for precipitating cellulose, although the yield was lower than in the case of pH adjustment with sulphuric acid. The results also show that the precipitate comes at higher pH than 7.

It has several advantages to perform cellulose precipitation with carbon dioxide, since this make closing of process streams in a pulp mill, easier. This since the sodium carbonate formed during the precipitation can be reconverted to sodium hydroxide with a lime cycle. In this process carbon dioxide is formed that can be used for the precipitation.

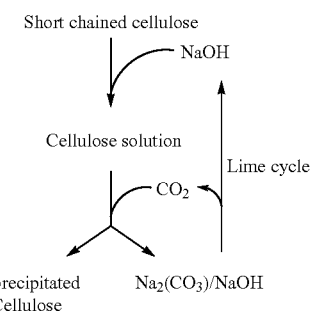

Example 7

Dissolution at Varying Concentration

Cellulose quality: Avicel (Microcrystalline cellulose)
Treatment conditions: Samples 0.05 g, 0.1 g, 0.25 g, 0.5 g, 1 g Avicel in 50 ml 1%, 5%, 8%, 10% NaOH respectively. All experiments were done at 4° C.
The solutions were evaluated regarding dissolution of Avicel.

| Avicel/g | $C_{NaOH}$ | | | |
|---|---|---|---|---|
| | 1% | 5% | 8% | 10% |
| 0.1 | dissolved | Dissolved | dissolved | dissolved |
| 0.2 | dissolved | Dissolved | dissolved | dissolved |
| 0.5 | Not dissolved | Dissolved | dissolved | dissolved |
| 1.0 | Not dissolved | Not dissolved | dissolved | dissolved |
| 2 | — | — | dissolved | dissolved |
| 4 | — | — | dissolved | dissolved |
| 10 | — | — | — | Gel like. |

Along with the increasing of the concentration of NaOH, more Avicel will be dissolved.

It is possible to perform dissolution of short chain cellulose to at least 4% in 8% and 10% NaOH respectively. 10% is too high a cellulose concentration. Lower concentrations of alkali can dissolve low concentrations of cellulose.

Example 8

Precipitation with Varying Temperature or pH

Cellulose quality: Avicel (Microcrystalline cellulose) pretreated with NaOH, the pretreatment was done by dissolving 1 g Avicel in 50 ml 10% NaOH at 4° C.

Treatment conditions: Attempts to precipitate the solution were performed according to two different strategies; Neutralizing the solution with sulphuric acid to pH approx 7, 9, and 11 (pH was determined) at 4° C., or increasing the temperature which is done by putting the solution into 100° C. water bath for 1.5 hours.

The evaluation was done by measuring the yield of the precipitation. A filtration method was used. The pH before precipitation was 14-14.6

| Precipitation method | Weight of the precipitation/g | yield |
| --- | --- | --- |
| Neutralize to pH 7.04 | 1.008 | 100.0% |
| Neutralize to pH 9.04 | 0.990 | 99.0% |
| Neutralize to pH 11.30 | 1.009 | 100.0% |
| Only increasing the temperature to >90° C. | 0.355 | 35.5%. The precipitate became yellow. |

In the previous examples the precipitation was performed by a combined increase of the temperature and decrease of pH to approximately neutral. Here the effects of lowering the pH lowering and increasing the temperature were investigated separately. The results show clearly that the most of the effect is achieved by lowering the pH. This implies that it is possible to run the process at constant temperature, which is advantageous since the sample does not have to undergo energy consuming temperature changes. The pH lowering can also be much smaller than what we have used earlier; a decrease to a pH around 11 seems to be enough, which is beneficial from an economical point of view. To use the same pH and only increase the temperature is an option, but seems to be less preferred for most applications. The yield of the precipitation at an increase of temperature to close to 100° C. was only around 35%, and the formation of yellow color indicates that the cellulose has undergone structural changes. Something that is likely under this very high temperature and alkalinity.

Example 9

Fock Test of Pretreated Samples

The example comprising the steps of dissolution of cellulose with a viscosity below 900 ml/g in alkali at a temperature below 20° C. followed by precipitation leads to a considerably increased reactivity measured by the Fock test. Indicating suitability for derivatization.

| Pulp | Reference sample Fock test Reactivity, % | Pretreated sample Fock test Reactivity, % |
| --- | --- | --- |
| Bleached Hardwood | 22 | 74 |
| Bleached Hardwood | 23 | 71 |
| Bleached Hardwood | 21 | 72 |
| Bleached Softwood | 38 | 69 |
| Bleached Softwood | 38 | 68 |
| Bleached Softwood | 38 | 74 |

The invention claimed is:

1. A process for derivatization of cellulose comprising:
   a) mixing cellulose with a viscosity below 900 ml/g with an aqueous solution to obtain a liquid, wherein said liquid is selected from the group consisting of a solution of cellulose, and a combination of a solution of cellulose and a colloid system comprising cellulose comprising cellulose particles having a diameter of 200 nm or less, wherein cellulose which has not been dissolved and/or suspended to a particle size with an average diameter of between 5-200 nm is removed, wherein particles of cellulose in the liquid have an average diameter of between 5-200 nm and wherein the aqueous solution has a temperature below 20° C., and a pH above 12;
   b) subjecting the liquid to at least one step selected from the group consisting of
      i) decreasing the pH of the liquid by at least 1 pH unit, and
      ii) increasing the temperature of the liquid by at least 20° C.; and
   c) derivatization of the cellulose in the liquid.

2. The process according to claim 1, wherein the viscosity of the cellulose of step a) is below 700 ml/g.

3. The process according to claim 2, further comprising a step performed before step a), wherein said step comprises lowering the viscosity of cellulose having a viscosity above 700 ml/g in order to obtain said cellulose with a viscosity below 700 ml/g of step a).

4. The process according to claim 3, wherein the viscosity is lowered by treatment with acid.

5. The process according to claim 3, wherein the viscosity is lowered by treatment with at least one method selected from the group consisting of treatment with Fenton reagent and treatment with an alkaline solution.

6. The process according to claim 1, further comprising a step performed before step a), wherein said step comprises lowering the viscosity of cellulose having a viscosity above 900 ml/g in order to obtain said cellulose with a viscosity below 900 ml/g of step a).

7. The process according to claim 6, wherein the viscosity is lowered by treatment with acid.

8. The process according to claim 6, wherein the viscosity is lowered by treatment with at least one method selected from the group consisting of treatment with Fenton reagent and treatment with an alkaline solution.

9. The process according to claim 1, wherein the aqueous solution comprises NaOH.

10. The process according to claim 1, wherein the aqueous solution comprises at least 2wt % NaOH.

11. The process according to claim 1, wherein the liquid is filtered between step a) and step b).

12. The process according to claim 1, wherein the liquid is centrifuged between step a) and step b).

13. The process according to claim 1, wherein the pH is decreased in step b) by addition of an acid.

14. The process according to claim 13, wherein the acid is sulphuric acid.

15. The process according to claim 1, wherein the pH is decreased in step b) by addition of at least one chemical entity selected from the group consisting of $CO_2$, $H_2CO_3$, and a combination thereof.

16. The process according to claim 1, wherein the temperature in step a) is below 15° C.

17. The process according to claim 1, wherein the temperature in step a) is below 10° C.

18. The process according to claim 1, wherein the temperature in step a) is below 4° C.

19. The process according to claim 1, wherein said derivatization step c) comprises chemical derivatization of the cellulose using acid catalysis.

20. The process according to claim 1, wherein said derivatization step c) comprises chemical derivatization of the cellulose using alkaline catalysis.

21. The process according to claim 1, wherein said derivatization step c) comprises chemical derivatization of the cellulose using oxidation.

22. The process of claim 1 wherein said cellulose which has not been dissolved and/or suspended to a particle size with an average diameter of between 5-200 nm are cellulose fibers larger than 200 nm.

23. The process of claim 1 wherein the removed cellulose is recycled thus minimizing waste of the cellulose.

* * * * *